US012595183B2

(12) United States Patent
Yun et al.

(10) Patent No.: US 12,595,183 B2
(45) Date of Patent: Apr. 7, 2026

(54) METHOD FOR PRODUCTION OF SHEET PHASE PSEUDO-BOEHMITE USING COUETTE-TAYLOR VORTEX REACTION

(71) Applicant: SK INNOVATION CO., LTD., Seoul (KR)

(72) Inventors: Dong Min Yun, Daejeon (KR); Hye Jin Park, Daejeon (KR); Young Eun Cheon, Daejeon (KR); Dae Hyun Choo, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 671 days.

(21) Appl. No.: 18/089,112

(22) Filed: Dec. 27, 2022

(65) Prior Publication Data

US 2023/0207960 A1 Jun. 29, 2023

(30) Foreign Application Priority Data

Dec. 27, 2021 (KR) ........................ 10-2021-0188565

(51) Int. Cl.
| | |
|---|---|
| *C01F 3/02* | (2006.01) |
| *B01J 19/18* | (2006.01) |
| *C01F 7/00* | (2022.01) |
| *C01F 7/02* | (2022.01) |
| *C01F 7/36* | (2006.01) |
| *H01M 50/403* | (2021.01) |
| *H01M 50/431* | (2021.01) |

(52) U.S. Cl.
CPC ................. *C01F 3/02* (2013.01); *B01J 19/18* (2013.01); *C01F 7/00* (2013.01); *C01F 7/02* (2013.01); *C01F 7/36* (2013.01); *C01P*

*2004/04* (2013.01); *C01P 2004/20* (2013.01); *H01M 50/403* (2021.01); *H01M 50/431* (2021.01); *Y02E 60/10* (2013.01)

(58) Field of Classification Search
CPC ........................................................ C01F 7/02
See application file for complete search history.

(56) References Cited

U.S. PATENT DOCUMENTS

| | | | |
|---|---|---|---|
| 6,153,337 | A | 11/2000 | Carlson et al. |
| 10,953,380 | B1 | 3/2021 | Lin et al. |
| 2009/0087568 | A1 | 4/2009 | Kobayashi |

FOREIGN PATENT DOCUMENTS

| | | | |
|---|---|---|---|
| CN | 103283060 A | 9/2013 | |
| CN | 104667850 A | * 6/2015 | ............. B01J 19/18 |
| CN | 108014732 A | * 5/2018 | ......... B01F 27/0541 |
| CN | 108321426 A | 7/2018 | |
| CN | 112520768 A | 3/2021 | |

(Continued)

OTHER PUBLICATIONS

English translation of CN-104667850-A Description. (Year: 2015).*

(Continued)

*Primary Examiner* — Anthony J Zimmer
*Assistant Examiner* — Zachary John Baum
(74) *Attorney, Agent, or Firm* — IP & T GROUP LLP

(57) ABSTRACT

A method for producing a sheet phase pseudo-boehmite. The method includes: a) putting an organic acid into an aqueous solution in which an aluminum precursor is dispersed; and b) putting a product from the process of a) into a Taylor reactor, wherein a pressure of the Taylor reactor is 1 to 100 bar.

10 Claims, 10 Drawing Sheets

(56) References Cited

FOREIGN PATENT DOCUMENTS

| | | | | | |
|---|---|---|---|---|---|
| JP | S6-254384 | B2 | 11/1987 | | |
| JP | 2002-532852 | A | 10/2002 | | |
| JP | 2013-535773 | A | 9/2013 | | |
| JP | 2015-160801 | A | 9/2015 | | |
| JP | 2019-199515 | A | 11/2019 | | |
| KR | 10-2006-0130522 | A | 12/2006 | | |
| KR | 20120028576 | A * | 3/2012 | .......... | B01J 19/0013 |
| KR | 10-2016-0044090 | A | 4/2016 | | |
| KR | 10-2017-0011214 | A | 2/2017 | | |
| TW | 201946869 | A | 12/2019 | | |
| WO | 0036671 | A1 | 6/2000 | | |

OTHER PUBLICATIONS

English translation of CN-108014732-A Description. (Year: 2018).*
English translation of KR-20120028576-A Description. (Year: 2012).*
English translation of CN 112520768 A Description. (Year: 2021).*
Schrimpf, M., et al. Taylor-Couette reactor: Principles, design, and applications. AIChE J. 2021;67:e17228. (Year: 2021).*

Conroy, M., et al. Importance of interlayer H bonding structure to the stability of layered minerals. Scientific Reports 7:13274 (2017). (Year: 2017).*
Office Action for Chinese Patent Application No. 202211744290.1 issued by the Chinese Patent Office on Sep. 25, 2025.
Office Action for the Japanese Patent Application No. 2022-209995 issued by the Japanese Patent Office on Jan. 7, 2025.
V.P. Pakharukova et al., Structure and morphology evolution of silica-modified pseudoboehmite aerogels during heat treatment, Journal of Solid State Chemistry, Nov. 4, 2015, pp. 294-302, vol. 233.
A. S. Lozhkomoev et al., Acid-Base and Adsorption Properties of the ALOOH 2D Nanostructures as Factors for Regulating Parameters of Model Biological Solutions, Nanotechnologies in Russia, Aug. 12, 2016, pp. 506-511, vol. 11,Nos. 7-8, Rossliskie Nanotekhnologii.
Hyeonyeol Jeon et al., Scalable Water-Based Production of Highly Conductive 2D Nanosheets with Ultrahigh Volumetric Capacitance and Rate Capability, Advanced Energy Materials, Mar. 30, 2018, pp. 1-11.
Extended European search report on the European Patent Application No. 22216707.4, issued by the European Patent Office on Jun. 7, 2023.

* cited by examiner

METHOD FOR PRODUCTION OF SHEET PHASE PSEUDO-BOEHMITE USING COUETTE-TAYLOR VORTEX REACTION

CROSS-REFERENCE TO RELATED APPLICATIONS

This application claims priority under 35 U.S.C. § 119 to Korean Patent Application No. 10-2021-0188565, filed on Dec. 27, 2021, in the Korean Intellectual Property Office, the disclosure of which is incorporated herein by reference in its entirety.

TECHNICAL FIELD

The following disclosure relates to a method for producing a sheet phase pseudo-boehmite using a Couette-Taylor vortex reaction. Specifically, the following disclosure relates to a method for producing a sheet phase pseudo-boehmite for single-sided or double-sided ceramic coating of a battery separator using a Couette-Taylor flow at a high temperature and high pressure environment.

BACKGROUND

A separator is a fine film which blocks contact between a positive electrode and a negative electrode in a battery used in electric vehicles, mobile phones, laptops, and the like to prevent an electrical contact between electrodes, thereby increasing stability of a battery. A separator for a battery has pores having a size of several tens of nanometers, through which ions pass.

A commonly used polyolefin-based separator can severely shrink at a high temperature and has a physically weak durability. Therefore, when an internal temperature of a battery rises due to the occurrence of battery abnormality, the separator is easily deformed. In serious cases, the battery electrodes may not remain separated, which may cause an explosion.

In order to solve the stability problem as such, a ceramic coated separator (CCS) having an inorganic particle layer using inorganic particles formed on one or both surfaces of a conventional polyolefin-based separator has been developed. The inorganic particles used therefor may include alumina, aluminum hydroxide, silica, barium oxide, titanium oxide, magnesium oxide, magnesium hydroxide, clay, glass powder, boehmite, a mixture thereof, or the like.

A battery using a separator provided with an inorganic particle coating layer, in particular, a pseudo-boehmite coating layer has improved in the case of release prevention of a significant amount of inorganic particles from the coating layer when a battery swells or when there is surface friction. This release of organic particles improves thermal stability of a battery. An inorganic particle coating layer using a pseudo-boehmite can weigh less than an inorganic particle coating layer using other inorganic particles such as alumina.

Pseudo-boehmite may have various forms and phases. It is known that an acicular pseudo-boehmite in which the main phase is a nanowire or nanorod phase may be obtained by growing it under acidic conditions, and a sheet phase pseudo-boehmite having a sheet main phase may be obtained by growing it under basic conditions. However, when a pseudo-boehmite is produced under basic conditions in order to be produced as a sheet phase, the pseudo-boehmite may not be formed to have a sufficiently small thickness.

A conventional synthesis method of a pseudo-boehmite uses a batch reactor. However, a batch reactor may not create a high temperature-high pressure atmosphere due to problems such as facility limitations, and in order to secure a sheet phase pseudo-boehmite by a batch reactor, a long reaction time of about 24 hours is usually needed. Thus, the production process is not efficient.

SUMMARY

One embodiment of the present disclosure is directed to improving efficiency of producing a pseudo-boehmite, in particular, of producing a sheet phase pseudo-boehmite, among the pseudo-boehmites.

Another embodiment of the present disclosure is directed to improving efficiency of producing a sheet phase pseudo-boehmite which may have a small thickness under an acidic atmosphere.

In one general aspect, a method for producing a sheet phase pseudo-boehmite includes: a) providing an organic acid into an aqueous solution in which an aluminum precursor is dispersed; and b) supplying a product from the process of a) into a Taylor reactor, wherein a pressure of the Taylor reactor is 1 to 100 bar while producing the sheet phase pseudo-boehmite.

According to one embodiment, a temperature of the Taylor reactor may be 100 to 300° C.

According to another embodiment, a reaction time of the Taylor reactor may be 1 to 20 hours.

According to still another embodiment, a stirring speed of the Taylor reactor may be 100 to 800 rpm.

According to yet another embodiment, the aluminum precursor may include one of an aluminum acetate salt, an aluminum nitrate salt, an aluminum sulfate salt, aluminum halides, aluminum sulfides, aluminum hydroxides, aluminum oxides, aluminum oxyhydroxides, aluminum alkoxides, $Al_2O_3$, $Al(OH)_3$, $Al_2(SO_4)_3$, $AlCl_3$, $Al(OP-i-Pr)_3$, $Al(NO_3)_3$, and $AlF_3$, or a mixture thereof.

According to one embodiment, the aqueous solution in which the aluminum precursor is dispersed may be prepared by dispersing the aluminum precursor in distilled water and then distilling the aqueous solution.

According to another embodiment, the organic acid may include one of acetic acid, propionic acid, butyric acid, lactic acid, oxalic acid, malic acid, tartaric acid, and citric acid, or a mixture thereof.

According to still another embodiment, a pH of the product from the process of a) may be 2 to 6.

According to yet another embodiment, the Taylor reactor may be a continuous Taylor reactor, and the product from the process of a) may be supplied into the Taylor reactor at an input rate of 0.1 to 10 ml/min.

According to one embodiment, the Taylor reactor may be a batch Taylor reactor, and the product from the process of a) may be supplied into fill 80% or more of a total volume of the Taylor reactor.

In another general aspect, a sheet phase pseudo-boehmite having a long diameter of 1 to 200 nm, a short diameter of 1 to 200 nm, and a thickness of 1 to 10 nm is provided.

According to another embodiment, a ratio of the long diameter/short diameter may be 5.0 or less.

According to still another embodiment, the sheet phase pseudo-boehmite may be produced by the processes including a) providing an organic acid into an aqueous solution in which an aluminum precursor is dispersed; and b) supplying the product from the process of a) into a Taylor reactor having a pressure of 1 to 100 bar.

According to yet another embodiment, a temperature of the Taylor reactor may be 100 to 300° C.

In another general aspect, a sheet phase pseudo-boehmite solution includes: 0.1 to 30 wt % of the sheet phase pseudo-boehmite according to the embodiment described above, more than 0 wt % and 5 wt % or less of an organic acid, and a balance of a solvent.

In yet another general aspect, a separator having a coating layer including the sheet phase pseudo-boehmite according to the embodiment described above disposed on one or both surfaces is provided.

In still another general aspect, an electrochemical device includes the separator according to the embodiment described above.

Other features and aspects will be apparent from the following detailed description, the drawings, and the claims.

DETAILED DESCRIPTION OF MAIN ELEMENTS

Figure 1:
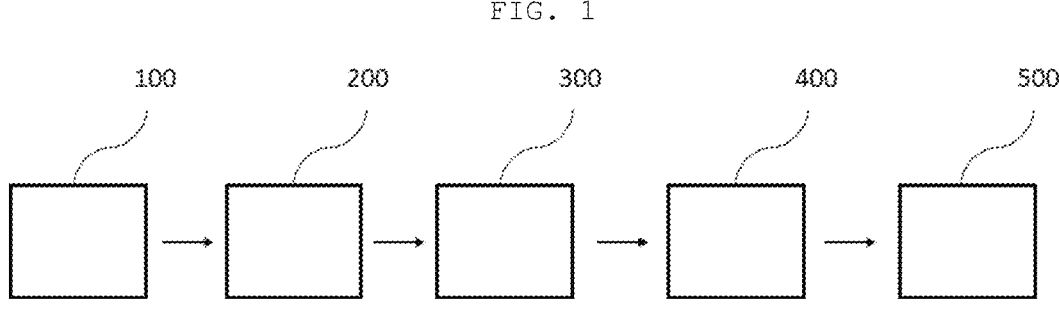
FIG. 1 is a device diagram of a Taylor reactor according to one embodiment of the present disclosure.

100: Gel slurry storage container
200: Pressure pump
300: Taylor reactor
400: Pressure regulating device
500: Storage container

DETAILED DESCRIPTION OF EMBODIMENTS

Advantages and features of the present disclosure and methods to achieve them will become apparent from the following embodiments described in detail with reference to the accompanying drawings. However, the present disclosure is not limited to the embodiments disclosed below, but will be implemented in various forms. The embodiments of the present disclosure make the present disclosure thorough and are provided so that those skilled in the art can understand the scope of the present disclosure. Detailed description for carrying out the present disclosure will be provided with reference to the accompanying drawings below. Regardless of the drawings, the same reference number indicates the same constitutional element, and "and/or" includes each of and all combinations of one or more of mentioned items.

Unless otherwise defined herein, all terms used herein (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

In the present specification, a "Taylor reactor" refers to all forms of reactors which may generate a Couette-Taylor vortex or a Couette-Taylor flow. The Taylor reactor may be, for example, a commercially available Taylor reactor, but is not limited thereto.

When a sheet phase pseudo-boehmite is used for coating of a battery CCS, the release of coating particles by battery expansion and a surface friction force is significantly improved, as compared with conventionally used inorganic particles. That is, when the sheet phase pseudo-boehmite is adopted as the main component of a coating layer of battery CCS, the thermal stability of a battery is further improved, and the weight of a coating layer may be reduced by replacing inorganic particles having a relatively high weight such as alumina. Until now, a technology capable of producing a sheet phase pseudo-boehmite with high efficiency has not been established.

The present inventors repeated research in order to address this problem, and as a result, found that when a pseudo-boehmite is produced by controlling a Taylor reactor to specific conditions, the efficiency of producing the sheet phase pseudo-boehmite may be improved. According to one embodiment of the present disclosure, a sheet phase pseudo-boehmite may be obtained by the processes including a) putting an organic acid into an aqueous solution in which an aluminum precursor is dispersed, and b) putting a product from the process of a) into a Taylor reactor. Each process will be described in detail.

According to another embodiment, a) an organic acid may be provided into an aqueous solution in which an aluminum precursor is dispersed.

According to still another embodiment, the aqueous solution in which an aluminum precursor is dispersed may be prepared by dispersing the aluminum precursor in distilled water and then distilling the solution. According to yet another embodiment, a condensed reaction by-product of the aluminum precursor aqueous solution may be removed by the distilling process. Here, distillation may be performed by distillation under reduced pressure, and the distillation under reduced pressure may be performed at 100 to 900 mbar, 200 to 800 mbar, or 300 to 700 mbar. The temperature of the aqueous solution may be 50 to 100° C., specifically 60 to 97° C., and more specifically 70 to 95° C.

The aluminum precursor according to a further embodiment may be an aluminum-containing material, and is not particularly limited thereto. The aluminum precursor may include one of an aluminum acetate salt, an aluminum nitrate salt, an aluminum sulfate salt, aluminum halides, aluminum sulfides, aluminum hydroxides, aluminum oxides, aluminum oxyhydroxides, and aluminum alkoxides, or a mixture thereof, or for example, may include one of $Al_2O_3$, $Al(OH)_3$, $Al_2(SO_4)_3$, $AlCl_3$, $Al(O\text{-}i\text{-}Pr)_3$, $Al(NO_3)_3$, and $AlF_3$, or a mixture thereof, but is not limited thereto.

The aluminum precursor may be, for example, aluminum alkoxide, considering the removal of a condensation reaction by-product during the distillation process described above. The aluminum alkoxide may have higher hydrolysis reactivity and allows easy removal of by-products. The aluminum alkoxide may be, for example, an aluminum alkoxide having an alkoxy group having 2 to 5 carbon atoms, and for example, one of aluminum ethoxide, aluminum isopropoxide, aluminum n-butoxide, and aluminum sec-butoxide, or a mixture thereof.

The organic acid according to one embodiment is added for the purpose of adjusting pH for producing a pseudo-boehmite, and any organic acid which achieves the purpose may be used. The organic acid may include, for example, one of acetic acid, propionic acid, butyric acid, lactic acid, oxalic acid, malic acid, tartaric acid, and citric acid, or a mixture thereof.

The product from the process of a) may be, for example, an aluminum gel solution. The pH of the product from the process of a) may be 2 to 6 or 3 to 5. According to this embodiment, a sheet phase pseudo-boehmite having a small thickness may be produced under acidic conditions, by using the acidic product from the process of a) into which the organic acid has been put. The thickness may be, for example, 1 to 10 nm, 1 to 5 nm, or 1 to 2 nm.

According to another embodiment, b) the product from the process of a) may be supplied into a Taylor reactor.

The Taylor reactor according to still another embodiment may be all forms of reactors which may generate a Couette-Taylor vortex or a Couette-Taylor flow, and the Taylor reactor according to an embodiment may include a production chamber having a space inside, a heater which controls the temperature of a plurality of spaces which are formed by dividing the inside space of the production chamber, an inner cylinder which is provided in each of the plurality of divided spaces and rotated by a motor, a pressure device which controls the pressure of the production chamber, and a pressure pump which supplies a reactant to the production chamber. Hereinafter, the present disclosure will be described with the Taylor reactor described above and the configuration thereof for better understanding, but it should be noted that the present disclosure is not limited thereto.

According to yet another embodiment, the product from the process of a) may be stored in a separate storage container, and then provided in the Taylor reactor.

According to an embodiment, a pressure pump provided in one side of the Taylor reactor may be used to provide the product from the process of a) to the production chamber. The pressure pump is not particularly limited in its configuration as long as the purpose described above is achieved. For example, the pressure pump may be one of a high performance liquid chromatography (HPLC) pump, a rotary pump, a syringe pump, a tubing pump, a diaphragm pump, a solenoid pump, a high pressure piston pump, a high pressure plunger pump, or a combination thereof.

Another embodiment, while a pressure pump provided in one side of the Taylor reactor is used, a pressure regulating device is provided on another side of the Taylor reactor, thereby providing the product from the process of a) more efficiently to the production chamber. The pressure regulating device may be, for example, one of a back pressure regulator (BPR), a pressure regulating ball valve, and a needle valve, or a combination thereof. According to one embodiment, a separate storage container which may store a product may be provided at the end of the pressure regulating device.

The Taylor reactor according to one present embodiment uses a Couette-Taylor flow, so that its stirring ability is better than that of a conventional batch reactor, and the atmosphere in the Taylor reactor may be created with high temperature-high pressure to improve the production efficiency of the sheet phase pseudo-boehmite.

According to a further embodiment, the temperature of the Taylor reactor may be 100 to 300° C. When the temperature of the Taylor reactor is lower than 100° C., crystals do not grow well, so that the ratio of an amorphous phase, a needle phase, or a rod phase is increased instead of a crystal phase. However, when the temperature of the Taylor reactor is higher than 300° C., crystals excessively grow, so that it may be difficult to produce a sheet phase pseudo-boehmite having a small thickness. Also producing the sheet phase pseudo-boehmite at room temperature may be costly and time-consuming. To improve the efficiency of producing a sheet phase pseudo-boehmite having a small thickness, the temperature of the Taylor reactor may be, for example, 150 to 250° C. or 170 to 200° C.

According to another embodiment, the pressure of the Taylor reactor may be 1 to 100 bar. When the pressure of the Taylor reactor is less than 1 bar, crystals do not grow well, so that the ratio of an amorphous phase, a needle phase, or a rod phase in which the crystal itself is not formed may be increased. However, it is difficult to control the pressure of the Taylor reactor to more than 100 bar due to the continuous process equipment limitations. To improve the efficiency of producing a sheet phase pseudo-boehmite, the pressure of the Taylor reactor may be, for example, 5 to 40 bar, 5 to 30 bar, 10 to 40 bar, 10 to 30 bar, 20 to 40 bar, or 20 to 30 bar.

According to still another embodiment, the temperature and the pressure of the Taylor reactor are controlled by a controller to the range described above to create a high temperature-high pressure atmosphere, and when a pseudo-boehmite grows in the high temperature-high pressure atmosphere, a reaction time for securing the pseudo-boehmite in a sheet phase may be significantly reduced. The reaction time for securing the sheet phase pseudo-boehmite may be, for example, 1 to 20 hours, specifically 3 to 10 hours, and more specifically 5 to 7 hours. When it is intended to secure a sheet phase pseudo-boehmite by a conventional batch reactor without a separate additional device or instrument, about 24 hours or more is needed. According to one embodiment of the present invention, however, a reaction time for producing a sheet phase is significantly decreased, and for example, a reaction time for securing a sheet phase pseudo-boehmite may be significantly decreased to about 6 hours, and thus, the production efficiency of the sheet phase pseudo-boehmite may be improved about 4 times as compared with the conventional one.

For the high temperature-high pressure atmosphere, according to another embodiment, when the pressure of the Taylor reactor is controlled to 5 bar or more, the temperature of the Taylor reactor may be 180° C. or higher.

Here, the pressure and the temperature of the Taylor reactor may be, for example, 5 to 40 bar and 180 to 300° C., 5 to 40 bar and 180 to 250° C., or 5 to 40 bar and 180 to 200° C.

For the high temperature-high pressure atmosphere, according to another embodiment, when the pressure of the Taylor reactor is controlled to 10 bar or more, the temperature of the Taylor reactor may be 170° C. or higher. Here, the pressure and the temperature of the Taylor reactor may be, for example, 10 to 40 bar and 170 to 300° C., 10 to 40 bar and 170 to 250° C., or 10 to 40 bar and 170 to 200° C.

According to yet another embodiment, the stirring speed of the Taylor reactor may be 100 to 800 rpm, 200 to 700 rpm, or 300 to 600 rpm. For securing more improved stirring ability, the stirring speed may be, for example, 100 rpm or more. Considering the equipment limitations and costs, it is preferred that the stirring speed may be 800 rpm or less.

According to one embodiment, the operation form of the Taylor reactor may be continuous or batch.

In the continuous Taylor reactor embodiment, the product from the process of a) is input in one side, and a product by the reaction may be obtained in the other side. The product from the process of a) may be put into the Taylor reactor at an input rate of 0.1 to 10 ml/min. The input rate may be, for example, 0.5 to 5 ml/min or 1 to 3 ml/min, considering the residence time of the reactant in the reactor. The residence time of the product from the process of a) put into the continuous Taylor reactor may be, for example, 1 to 20 hours for securing the sheet phase pseudo-boehmite, 3 to 10 hours considering the production efficiency, or 5 to 7 hours further considering the production efficiency.

In the batch Taylor reactor embodiment, the product from the process of a) is input in one side, and the product from the process of a) input thereto may be 80% or more of the total volume of the Taylor reactor. The reaction time of the product from the process of a) put into the batch Taylor reactor may be, for example, 1 to 20 hours, 3 to 10 hours considering the production efficiency, or 5 to 7 hours further considering the production efficiency.

According to a specific embodiment of the present disclosure, the operating conditions of the Taylor reactor may be continuous for producing a pseudo-boehmite in large quantities.

The Taylor reactor according to one embodiment will be described using FIG. 1 attached for better understanding. FIG. 1 is a device diagram of the Taylor reactor. When the Taylor reactor is configured batchwise, it may be configured by excluding a pressure regulating device 400 from the device diagram of FIG. 1, When the Taylor reactor is configured continuously, it may be configured to include all components shown in FIG. 1. Since a batch reactor performs the reaction in a state the pressure has reached the Taylor reactor 300, it does not need an additional pressure regulating device 400. However, a continuous reactor further has a pressure regulating device 400 which regulates pressure at the rear end of the reactor for preventing pressure drop inside the Taylor reactor 300, in order to continuously discharge the product.

Referring to FIG. 1, according to the batch Taylor reactor embodiment, a reactant (aluminum gel) stirred from a gel slurry storage container 100 may be transferred to the Taylor reactor 300 at a constant speed by a pressure pump 200. The reaction proceeds using a Couette-Taylor flow in the Taylor reactor 300. Thereafter, the completed product of the reaction is transferred to the storage container 500.

Referring to FIG. 1, according to the continuous Taylor reactor embodiment, a reactant (aluminum gel) stirred from a gel slurry storage container 100 may be transferred to the Taylor reactor 300 at a constant speed by a pressure pump 200. The reaction proceeds using a Couette-Taylor flow in the Taylor reactor 300. Thereafter, the completed product of the reaction is transferred to the storage container 500 (a completed product storage container). Here, a pressure regulating device 400 is disposed at the rear end of the Taylor reactor 300 to prevent the internal pressure of the Taylor reactor 300 from dropping, thereby continuously discharging the product.

According to one embodiment, a pseudo-boehmite produced by one of the processes described above or the combination thereof may be a sheet phase pseudo-boehmite.

The sheet phase pseudo-boehmite embodiment may have a long diameter of 1 to 200 nm and a short diameter of 1 to 200 nm, when observed with TEM. According to a specific embodiment, a ratio of long diameter/short diameter may be 5.0 or less, or 3.0 or less. In the present specification, a "long diameter" refers to a length in a longest length in the major axis on the pseudo-boehmite measured with TEM, and a "short diameter" refers to a longest length on the pseudo-boehmite in the direction perpendicular to the long diameter.

Since TEM observation is performed in a direction perpendicular to the thickness direction of the sheet phase pseudo-boehmite, in one embodiment, the sheet phase pseudo-boehmite has a small thickness. According to this embodiment, the sheet phase pseudo-boehmite may have a thickness of 1 to 10 nm, 1 to 5 nm, or 1 to 2 nm.

According to another embodiment, a sheet phase pseudo-boehmite solution including: 0.1 to 30 wt % of the sheet phase pseudo-boehmite described above, more than 0 wt % and 5 wt % or less of an organic acid, and a balance of a solvent may be provided. According to one embodiment, the sheet phase pseudo-boehmite solution may be sprayed on one or both surfaces of a separator by a device or instrument and dried.

According to a further embodiment, a separator having a coating layer including the sheet phase pseudo-boehmite disposed on one or both surfaces may be provided.

According to still another embodiment, an electrochemical device including the separator described above may be provided. The electrochemical device is not limited to, but include, for example, a primary battery, a secondary battery, a fuel battery, a capacitor, and the like. When the electrochemical device is a battery, it may be completed by disposing and assembling a negative electrode, a positive electrode, and a separator between the negative electrode and the positive electrode, and injecting an electrolyte solution.

The positive electrode is not limited to, but includes a common material. For example, the positive electrode may include a composite oxide formed of lithiated magnesium oxide, lithiated cobalt oxide, lithiated nickel oxide, or a combination thereof, and the like.

As a negative active material, a common negative electrode active material may be used. For example, a lithium metal, activated carbon, a carbonaceous material such as graphite, and the like. The present invention, however, is not particularly limited thereto.

Each of a positive electrode active material and a negative electrode active material is used by binding the material to a positive electrode current collector or a negative electrode current collector. As the positive electrode current collector, an aluminum foil, a nickel foil, and the like may be used, and the negative electrode current collector may be selected from copper, nickel, and the like. However, the present invention is not limited thereto, but may include any material that is commonly used as a negative electrode current collector.

Since the electrolyte solution is not limited as long as it is used in the art, it will not be described any more in the present disclosure.

Hereinafter, the specific examples and comparative examples of the present embodiment will be described.

However, the following examples are only a specific example of the present invention, and the present invention is not limited thereto.

EXAMPLES

Initial pressure in the following Examples 1 and 2 and Comparative Examples 1 to 8 refers to a pressure in a reactor before inputting a reactant or immediately after inputting a reactant. Reaction pressure and reaction time refer to the pressure and the reaction time in the reactor after a temperature is raised and reaches a target temperature after inputting a reactant. Residence time refers to a time during which the reactant stays in the reactor when the operating conditions of the Taylor reactor were continuous.

Example 1

306 g of an aluminum precursor was put into 1600 g of distilled water and dispersed therein, and at this time, aluminum isopropoxide was used as the aluminum precursor. Thereafter, distillation under reduced pressure was performed at 500 mbar and 95° C. to remove isopropyl alcohol, thereby preparing an aqueous solution in which the aluminum precursor was dispersed.

a) An organic acid was put into a prepared aqueous solution in which the aluminum precursor was dispersed to prepare an aluminum gel solution at pH 4 to 5. At this time, 10 g of a lactic acid was used as the organic acid.

b) The prepared aluminum gel solution was put into a Taylor reactor while a Taylor flow was produced by operating the shaft of the Taylor reactor at 600 rpm so that 90% of the total volume of the Taylor reactor was filled, the reactor was fastened, and the internal temperature of the Taylor reactor was raised up to 180° C.

Thereafter, reaction pressure in the Taylor reactor was controlled to 10 bar, and the reaction was performed by maintaining the pressure for the reaction time described in Table 1. After the reaction, only the temperature was cooled to room temperature while the shaft was operated, and the product was obtained in the lower side of the reactor. At this time, the operating conditions of the Taylor reactor were batchwise.

Example 2

The aluminum gel solution of Example 2 was prepared under the same conditions as Example 1. A back pressure regulator (BPR) was disposed at the rear end of the Taylor reactor, and the shaft of the Taylor reactor was operated at 600 rpm, so that the prepared aluminum gel solution produced a Taylor flow, and the temperature inside the Taylor reactor was raised to 180° C. The aluminum gel solution was put into the Taylor reactor was injected at 1 ml/min in one side, and a product from the reaction was obtained in the other side. At this time, the initial pressure was controlled to 10 bar and the reaction pressure was controlled to 10 bar in the Taylor reactor, and the reactant in the Taylor reactor stayed for the residence time described in Table 1. The operating conditions of the Taylor reactor were continuous.

Comparative Example 1

The product was obtained under the same conditions as Example 1, except the reaction time described in Table 1.

The reaction time of Comparative Example 1 was 3 hours. At this time, the operating conditions of the Taylor reactor were batchwise.

Comparative Example 2

The product was obtained under the same conditions as Example 1, except the reaction time described in Table 1. The reaction time of Comparative Example 2 was 1 hours. At this time, the operating conditions of the Taylor reactor were batchwise.

Comparative Example 3

The aluminum gel solution of Comparative Example 3 was prepared under the same conditions as Example 1. The thus-prepared aluminum gel solution was put into the conventional batch reactor provided with a propeller. At this time, the stirring speed was 300 rpm, and the reaction was performed by raising the temperature to 180° C. at 5° C./min and then maintaining at 180° C. for 24 hours. The reaction pressure in the batch reactor during the reaction time was less than 5 bar. Thereafter, the temperature was cooled to room temperature, and the product was obtained.

Comparative Example 4

The reaction was performed by pressurizing $N_2$ gas for the reaction time described in Table 1 with a separate pressurizer to maintain the initial pressure in the conventional batch reactor at 5 bar at 180° C. for 6 hours during the reaction time. The reaction pressure in the batch reactor during the reaction time was less than 10 bar. Thereafter, the temperature was cooled to room temperature, and the product was obtained.

Comparative Example 5

The product was obtained under the same conditions as Comparative Example 3 in a conventional batch reactor except the reaction time described in Table 1.

Comparative Example 6

The product was obtained under the same conditions as Comparative Example 3, except that the reaction time was as described in Table 1 and the reaction pressure was normal pressure (1 bar) with an open system batch reactor for a reaction time.

Comparative Examples 7 and 8

The product was obtained under the same conditions as Example 2, except the residence time described in Table 1. The residence time of Comparative Example 7 was 1.42 hours, and the residence time of Comparative Example 8 was 0.94 hours. At this time, the operating conditions of the Taylor reactor were continuous.

The results of Table 1 are shown by taking the TEM photographs of each of the examples and the comparative examples using Tecnai F30 transmission electron microscope (TEM) equipment and then classifying the results into a sheet phase (Examples 1 and 2, Comparative Examples 3 and 4) and an amorphous phase (Comparative Example 2). Comparative Example 1 and 5 to 8 in which both the sheet phase and the amorphous phase were observed means that the sheet phase form and the amorphous form were mixed since crystallization were not completed.

From the results of Table 1, the sheet phase form may refer to formation of a sheet phase form at a certain amount or more based on the observed TEM photograph, and the amorphous form may refer to formation of an amorphous phase at a certain amount or more based on the observed TEM photograph. At this time, the "sheet phase" may refer to a phase in which the thickness of the pseudo-boehmite is smaller than the long diameter or the short diameter and the ratio of long diameter/short diameter is 5.0 or less, or may refer to a phase showing an electron diffraction pattern in TEM analysis. An "amorphous phase" may refer to a phase which has an amorphous phase having no regular shape, or does not show an electron diffraction pattern in TEM analysis.

Figure 2:
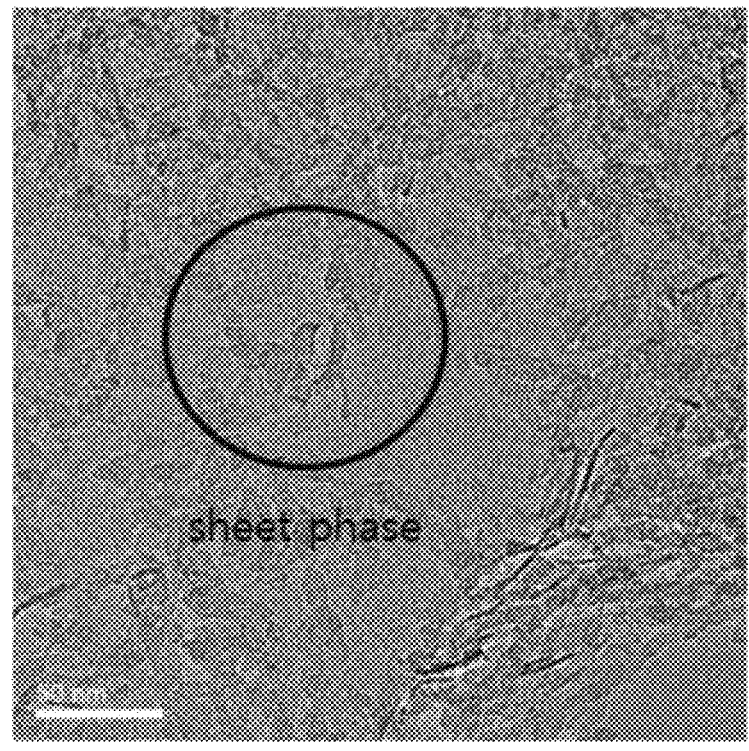
FIG. 2 is a TEM photograph of a pseudo-boehmite of Example 1.
Figure 4:
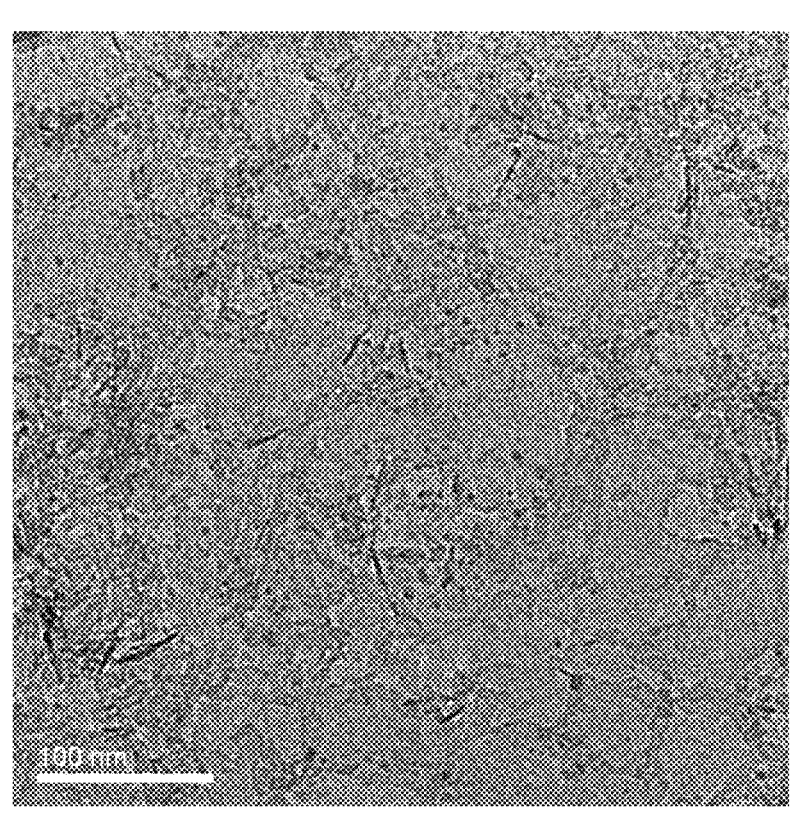
FIG. 4 is a TEM photograph of a pseudo-boehmite of Comparative Example 1.
Figure 5:
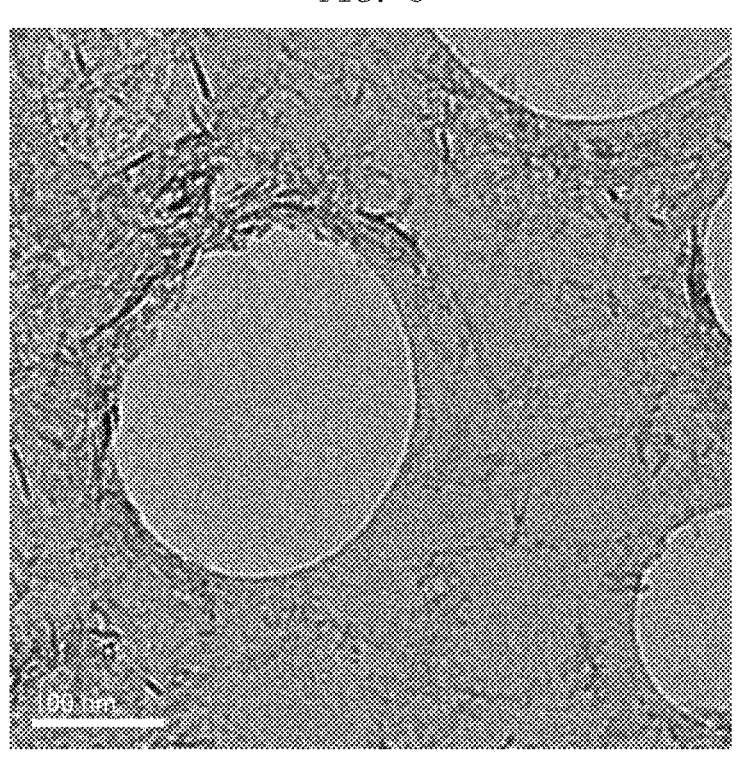
FIG. 5 is a TEM photograph of a pseudo-boehmite of Comparative Example 2.
Figure 6:
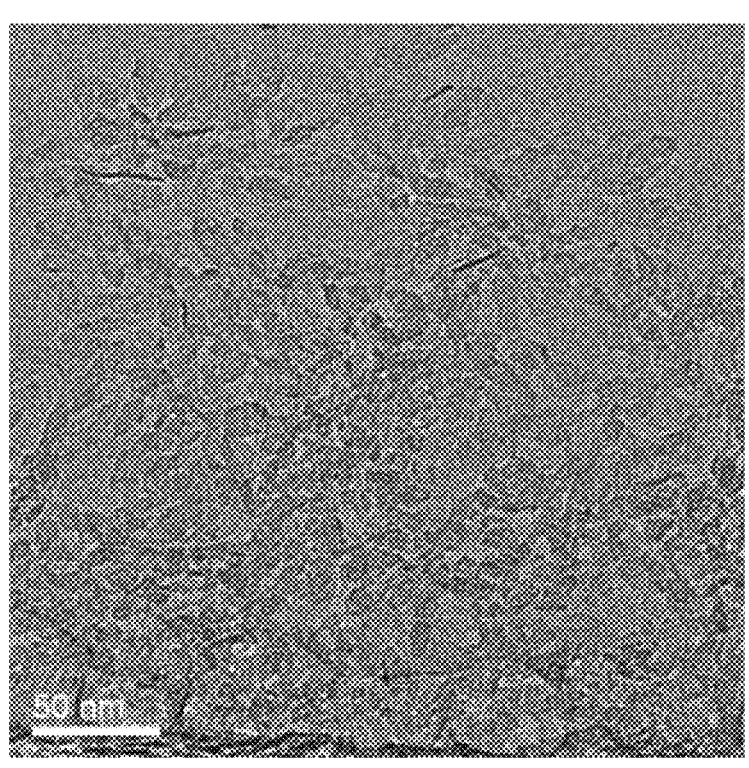
FIG. 6 is a TEM photograph of a pseudo-boehmite of Comparative Example 3.
Figure 9:
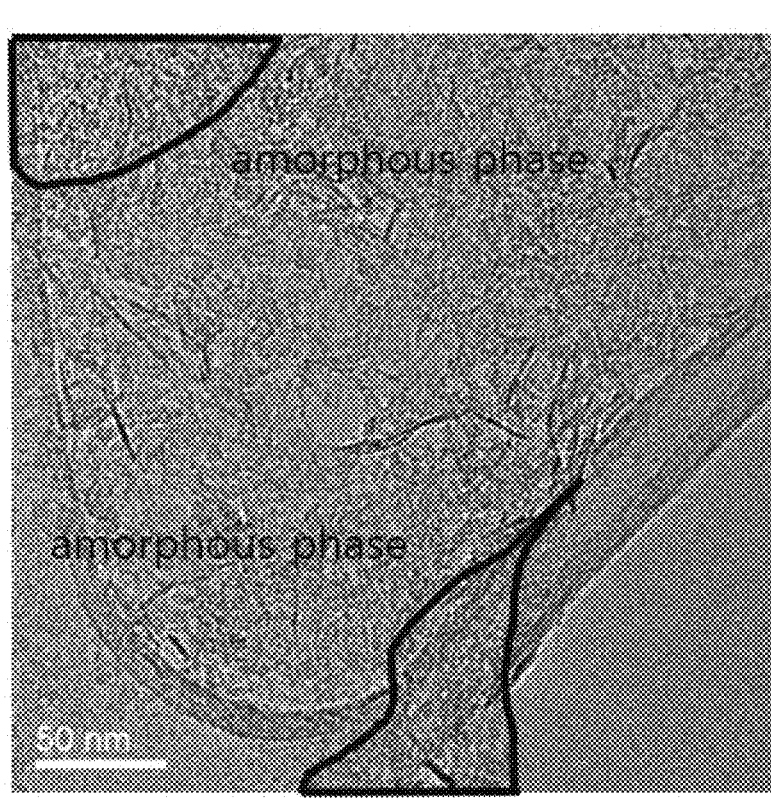
FIG. 9 is a TEM photograph of a pseudo-boehmite of Comparative Example 6.

For better understanding of the "sheet phase" and the "amorphous phase", the regions of these phases were indicated in FIGS. 2 and 9, respectively, but the present disclosure is not limited thereto.

pseudo-boehmites were observed (FIG. 4), and in Comparative Example 2 in which the reaction time was 1 hour, an amorphous pseudo-boehmite was produced (FIG. 5). From the results described above, it was found that the reaction time defined in the present embodiment should be satisfied in order to secure the sheet phase pseudo-boehmite.

Figure 3:
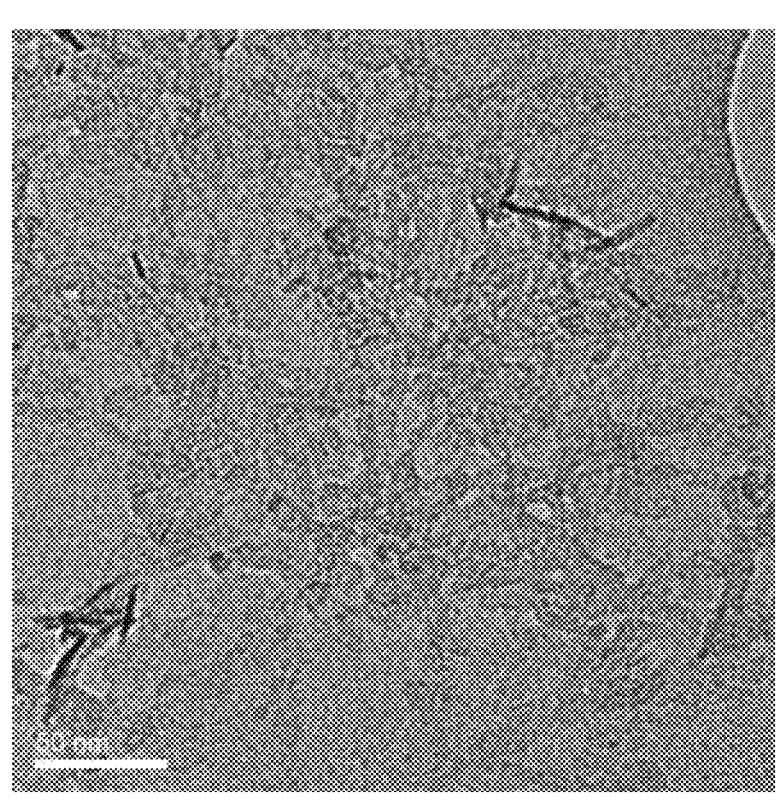
FIG. 3 is a TEM photograph of a pseudo-boehmite of Example 2.
Figure 10:
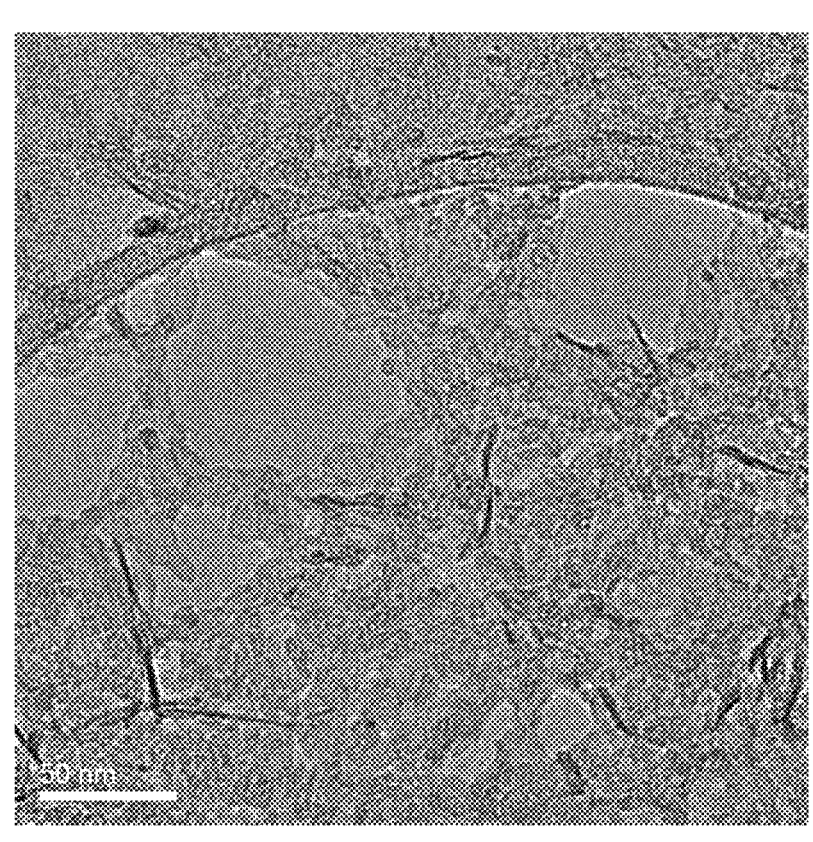
FIG. 10 is a TEM photograph of a pseudo-boehmite of Comparative Example 7.
Figure 11:
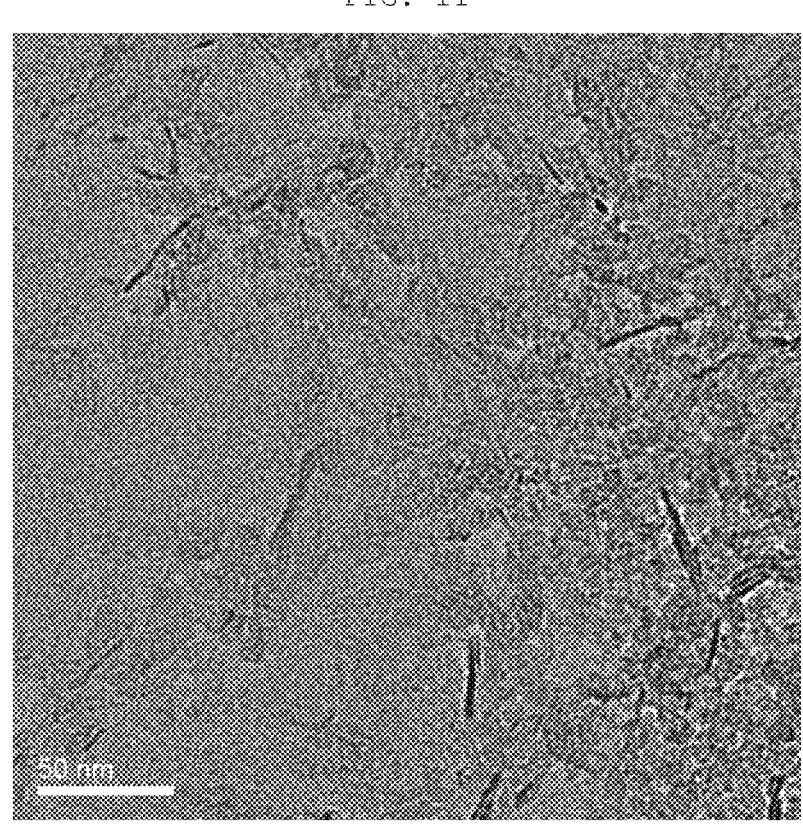
FIG. 11 is a TEM photograph of a pseudo-boehmite of Comparative Example 8.

When the operating conditions of the Taylor reactor were configured continuously, the results of Example 2 and Comparative Examples 7 and 8 in which only the reaction time was controlled differently for evaluating the effect of the reaction time were compared. In Example 2 in which the reaction time or the residence time was 2.83 hours, a sheet phase pseudo-boehmite was produced (FIG. 3), and in Comparative Example 7 in which the reaction time was 1.42 hours and in Comparative Example 8 in which the reaction time was 0.94 hours, sheet phase and amorphous pseudo-boehmites were produced (FIGS. 10 and 11). When FIGS. 3, 10, and 11 were compared, the sheet phase pseudo-boehmites were produced in all of Example 2 and Comparative Examples 7 and 8, but the sheet phase of FIG. 3 was the most

TABLE 1

| | Reactor type | Operating conditions | Temperature (° C.) | Stirring speed (rpm) | Initial pressure (bar) | Reaction pressure (bar) | Reaction time (hr) | Residence time (hr) | Results |
|---|---|---|---|---|---|---|---|---|---|
| Example 1 | Taylor reactor | Batchwise | 180 | 600 | — | 10 | 6 | — | Sheet phase |
| Example 2 | Taylor reactor | Continuous | 180 | 600 | 10 | 10 | — | 2.83 | Sheet phase, |
| Comparative Example 1 | Taylor reactor | Batchwise | 180 | 600 | — | 10 | 3 | — | Sheet phase, amorphous phase |
| Comparative Example 2 | Taylor reactor | Batchwise | 180 | 600 | — | 10 | 1 | — | Amorphous phase |
| Comparative Example 3 | Batch reactor | Batchwise | 180 | 300 | — | 5 | 24 | — | Sheet phase |
| Comparative Example 4 | Batch reactor | Batchwise | 180 | 300 | 5 | 10 | 6 | — | Sheet phase |
| Comparative Example 5 | Batch reactor | Batchwise | 180 | 300 | — | 5 | 6 | — | Sheet phase, amorphous phase |
| Comparative Example 6 | Batch reactor | Batchwise | 180 | 300 | — | 1 | 6 | — | Sheet phase, amorphous phase |
| Comparative Example 7 | Taylor reactor | Continuous | 180 | 600 | 10 | 10 | — | 1.42 | Sheet phase, amorphous phase |
| Comparative Example 8 | Taylor reactor | Continuous | 180 | 600 | 10 | 10 | — | 0.94 | Sheet phase, amorphous phase |

Hereinafter, each of the examples and the comparative examples is compared and evaluated with reference to Table 1 and the attached drawings. In Examples 1 and 2 according to the present embodiment, the sheet phase pseudo-boehmite was able to be secured using the Taylor reactor, even with a relatively short time of 6 hours or less of the reaction time and the residence time, respectively.

When the operating conditions of the Taylor reactor were configured batchwise, the results of Example 1 and Comparative Examples 1 and 2 in which only the reaction time was controlled differently for evaluating the effect of the reaction time were compared. In Example 1 in which reaction time was 6 hours, a sheet phase pseudo-boehmite was produced (FIG. 2), in Comparative Example 1 in which the reaction time was 3 hours, sheet phase and amorphous clear, and thus, Example 2 had the highest growth degree of crystals, and when FIG. 3 and FIG. 10 were compared, the sheet phase was not formed well in Comparative Example 7 as compared with Example 2, but when FIG. 10 and FIG. 11 are compared, the sheet phase was formed comparatively clearly in Comparative Example 7 as compared with Comparative Example 8. It was found from the results that a longer reaction time is advantageous for securing the sheet phase pseudo-boehmite.

Figure 7:
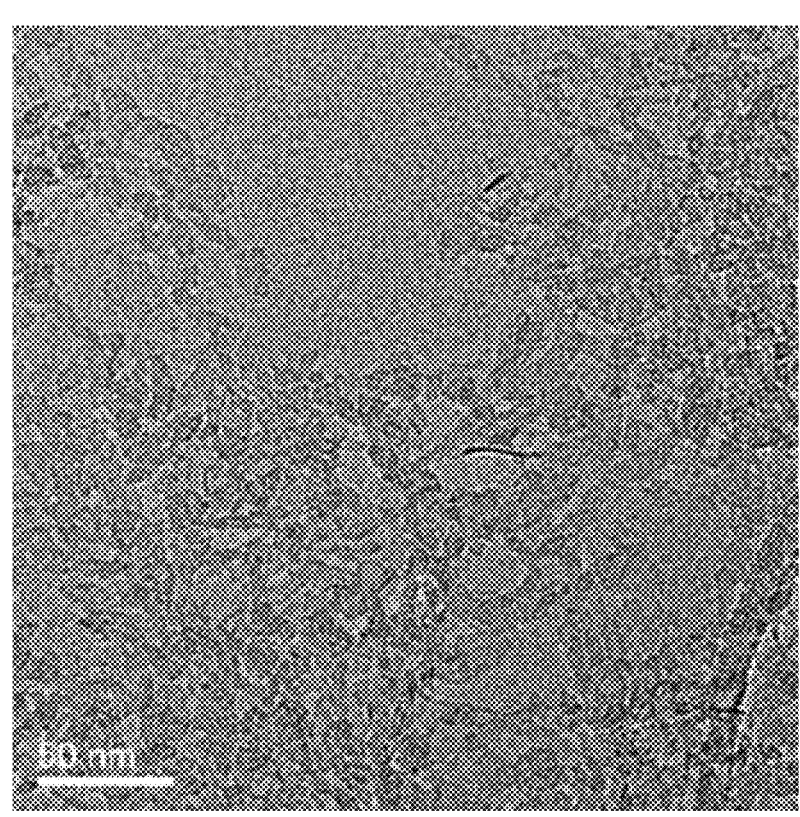
FIG. 7 is a TEM photograph of a pseudo-boehmite of Comparative Example 4.

In order to evaluate the effect on the reactor type, the results of Example 1 and Comparative Example 4 having the same reaction time were compared. The sheet phase pseudo-boehmite was produced for the reaction time of 6 hours without initial pressure in Example 1 (FIG. 2), while the initial pressure of 5 bar was pressurized to the conventional batch reactor to produce the pseudo-boehmite under the same reaction conditions as Example 1 in Comparative Example 4 (FIG. 7). This is because when the reaction time is the same, the Taylor reactor had a better stirring ability with the good use of the Couette-Taylor flow, and the Taylor reactor using the Couette-Taylor flow may secure the production efficiency of the sheet phase pseudo-boehmite which is higher than a common batch reactor under high temperature-high pressure conditions.

Figure 8:
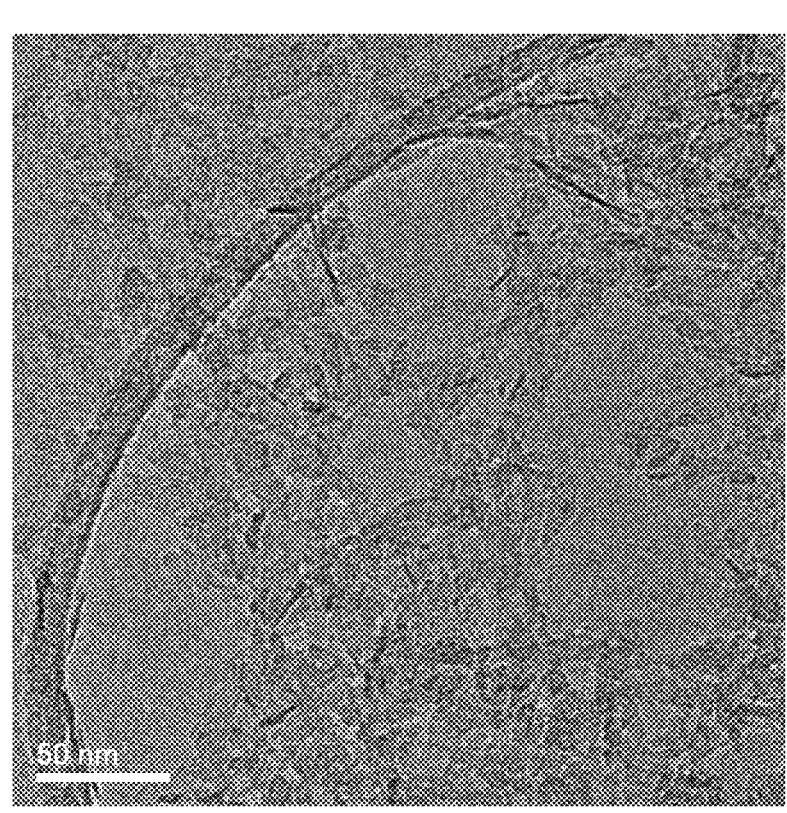
FIG. 8 is a TEM photograph of a pseudo-boehmite of Comparative Example 5.

In order to evaluate the effect on the reactor pressure, the results of Example 1 and Comparative Examples 5 and 6 having the same reaction time were compared. Comparative Examples 5 and 6 had the same reaction time of 6 hours as that in Example 1, but in Comparative Example 5, a closed system batch reactor was used without a separate pressurizer provided, and thus, the reaction pressure was 5 bar, and in Comparative Example 6, an open system batch reactor was used so that the reaction pressure was a normal pressure (1 bar). In Example 1, the sheet phase pseudo-boehmite was produced (FIG. 2), but in Comparative Examples 5 and 6, the reaction pressure was lower than Example 1, so that sheet phase and amorphous pseudo-boehmites were produced (FIGS. 8 and 9). When FIGS. 8 and 9 were compared, in Comparative Example 5 having a relatively high reaction pressure, a sheet phase were formed relatively clearly, as compared with Comparative Example 6. It was found from the results described above that a higher reaction pressure is advantageous for securing the sheet phase pseudo-boehmite.

In order to evaluate the required reaction conditions for securing the sheet phase pseudo-boehmite, the results of Example 1 and Comparative Example 3 in which the sheet phase pseudo-boehmite was formed were compared. While the sheet phase pseudo-boehmite was produced for the reaction time of 6 hours in Example 1 (FIG. 2), in Comparative Example 3 configured only with the batch reactor including a common propeller, the reaction time for producing the sheet phase pseudo-boehmite was 24 hours, so that the production efficiency was different at 4 times or more for the reaction time for preparing the sheet phase pseudo-boehmite. These results were due to the deteriorated stirring ability of the conventional batch reactor as compared with the Taylor reactor. In Comparative Example 4, the initial pressure of 5 bar and the reaction pressure of 10 bar were configured using a separate pressurizer, and the sheet phase pseudo-boehmite was secured for the reaction time of 6 hours (FIG. 7), but the industrial advantage was poorer than Example 1, in that a separate pressure was used. It was found from the results described above that the Taylor reactor had a better stirring ability with the good use of the Couette-Taylor flow, and the Taylor reactor using the Couette-Taylor flow may secure the production efficiency of the sheet phase pseudo-boehmite which is higher than a common batch reactor under high temperature-high pressure conditions.

According to one embodiment of the present disclosure, a Taylor reactor using a Couette-Taylor flow has better stirring ability as compared with a conventional batch reactor, and controls the Taylor reactor to specific high temperature-high pressure conditions to improve the production efficiency of the sheet phase pseudo-boehmite.

In the conventional batch reactor, it is difficult to create the high pressure conditions without a separate pressurizer, and a deviation of reaction pressure according to initial pressure is large, but in the Taylor reactor according to one embodiment of the present disclosure, it is easy to create high pressure conditions, and a deviation of reaction pressure according to initial pressure is small, and thus, the Taylor reactor of the present disclosure is advantageous for mass production.

When the conventional batch reactor is used, it is difficult to adjust the reaction conditions during the reaction in progress after inputting a reactant, but in the Taylor reactor according to one embodiment of the present disclosure, reaction conditions may be easily adjusted even during the reaction in progress, so that immediate feedback for a reaction process is allowed, and thus, the Taylor reactor of the present disclosure has excellent industrial advantages.

According to another embodiment of the present disclosure, a sheet phase pseudo-boehmite may be produced in large quantities using a continuous Taylor reactor, and thus, the industrial advantage is excellent.

According to another embodiment of the present disclosure, production efficiency of a sheet phase pseudo-boehmite having a small thickness may be improved under an acidic atmosphere.

In the above description, the embodiments of the present invention are described, but the present invention is not limited thereto, and those with ordinary skill in the art may understand that various changes and modification are possible within the range which is not out of the ranges of the claims listed below.

What is claimed is:

1. A method for producing a sheet phase pseudo boehmite, the method comprising:
    a) providing an organic acid into an aqueous solution in which an aluminum precursor is dispersed; and
    b) supplying a product from the process of a) into a Taylor reactor,
    wherein a pressure of the Taylor reactor is maintained at 1 to 100 bar while producing the sheet phase pseudo boehmite.

2. The method for producing a sheet phase pseudo boehmite of claim 1, wherein a temperature of the Taylor reactor is 100 to 300° C.

3. The method for producing a sheet phase pseudo boehmite of claim 1, wherein a reaction time of the Taylor reactor is 1 to 20 hours.

4. The method for producing a sheet phase pseudo boehmite of claim 1, wherein a stirring speed of the Taylor reactor is 100 to 800 rpm.

5. The method for producing a sheet phase pseudo boehmite of claim 1, wherein the aluminum precursor includes one of an aluminum acetate salt, an aluminum nitrate salt, an aluminum sulfate salt, aluminum halides, aluminum sulfides, aluminum hydroxides, aluminum oxides, aluminum oxyhydroxides, aluminum alkoxides, $Al_2O_3$, $Al(OH)_3$, $Al_2(SO_4)_3$, $AlCl_3$, $Al(O\text{-}i\text{-}Pr)_3$, $Al(NO_3)_3$, and $AlF_3$, or a mixture thereof.

6. The method for producing a sheet phase pseudo boehmite of claim 1, wherein the aqueous solution in which the aluminum precursor is dispersed is prepared by dispersing the aluminum precursor in distilled water and then distilling the aqueous solution.

7. The method for producing a sheet phase pseudo boehmite of claim 1, wherein the organic acid includes one of acetic acid, propionic acid, butyric acid, lactic acid, oxalic acid, malic acid, tartaric acid, and citric acid, or a mixture thereof.

8. The method for producing a sheet phase pseudo boehmite of claim 1, wherein a pH of the product from the process of a) is 2 to 6.

9. The method for producing a sheet phase pseudo boehmite of claim 1, wherein the Taylor reactor is a continuous Taylor reactor, and the product from the process of a) is supplied into the Taylor reactor at an input rate of 0.1 to 10 ml/min.

10. The method for producing a sheet phase pseudo boehmite of claim 1, wherein the Taylor reactor is a batch Taylor reactor, and the product from the process of a) is supplied to fill 80% or more of a total volume of the Taylor reactor.

\* \* \* \* \*